United States Patent
Chiashi et al.

(10) Patent No.: US 9,630,274 B2
(45) Date of Patent: Apr. 25, 2017

(54) FRICTION STIR SPOT WELDING STRUCTURE

(71) Applicant: TOYOTA JIDOSHA KABUSHIKI KAISHA, Toyota-shi, Aichi-ken (JP)

(72) Inventors: Kohei Chiashi, Okazaki (JP); Yutaka Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/953,211

(22) Filed: Nov. 27, 2015

(65) Prior Publication Data

US 2016/0184921 A1 Jun. 30, 2016

(30) Foreign Application Priority Data

Dec. 26, 2014 (JP) .................. 2014-266274

(51) Int. Cl.
| | | |
|---|---|---|
| *B23K 20/12* | (2006.01) | |
| *B32B 15/01* | (2006.01) | |
| *B32B 7/04* | (2006.01) | |
| *B23K 20/227* | (2006.01) | |
| *B23K 20/233* | (2006.01) | |
| *B23K 20/24* | (2006.01) | |
| *B23K 101/00* | (2006.01) | |
| *B23K 101/18* | (2006.01) | |
| *B23K 103/04* | (2006.01) | |
| *B23K 103/10* | (2006.01) | |

(52) U.S. Cl.
CPC ........ *B23K 20/1265* (2013.01); *B23K 20/227* (2013.01); *B23K 20/2333* (2013.01); *B23K 20/24* (2013.01); *B32B 7/045* (2013.01); *B32B 15/01* (2013.01); *B23K 2201/006* (2013.01); *B23K 2201/18* (2013.01); *B23K 2203/04* (2013.01); *B23K 2203/10* (2013.01); *B32B 2250/02* (2013.01)

(58) Field of Classification Search
CPC ..... B23K 20/12; B23K 20/122–20/129; B32B 7/045; B32B 2250/02; B32B 15/01
USPC ................ 228/112.1, 2.1, 135–139; 428/594
See application file for complete search history.

(56) References Cited

U.S. PATENT DOCUMENTS

| | | | | |
|---|---|---|---|---|
| 5,524,406 A | * | 6/1996 | Ragland | ............... B23K 11/087 |
| | | | | 219/117.1 |
| 5,979,742 A | * | 11/1999 | Enomoto | ............ B23K 20/122 |
| | | | | 228/112.1 |

(Continued)

FOREIGN PATENT DOCUMENTS

| | | | |
|---|---|---|---|
| JP | 11047959 A | * | 2/1999 |
| JP | 2003260573 A | * | 9/2003 |

(Continued)

*Primary Examiner* — Kiley Stoner
(74) *Attorney, Agent, or Firm* — Oliff PLC

(57) ABSTRACT

A friction stir spot welding structure includes a pair configured of an upper side flange portion and a lower side flange portion that are friction stir spot welded together by being pressed by a rotating pin rotating from one thickness direction side at a mutually overlapping location. A pair of protruding portions that project out in a protruding shape from the upper side flange portion toward the lower side flange portion are formed to the upper side flange portion. A pair of engagement holes into which the pair of protruding portions are inserted are formed to the lower side flange portion.

8 Claims, 9 Drawing Sheets

(56) References Cited

U.S. PATENT DOCUMENTS

| | | | | |
|---|---|---|---|---|
| 6,178,601 B1* | 1/2001 | Craig, Jr. | ............... | F16L 33/025 24/20 CW |
| 7,698,797 B2* | 4/2010 | Hetrick | ................ | B21D 39/031 228/110.1 |
| 8,033,443 B1* | 10/2011 | Sigler | .................. | B23K 20/126 228/112.1 |
| 8,561,877 B2* | 10/2013 | Carlson | ................... | B62D 27/02 228/112.1 |
| 9,196,890 B2* | 11/2015 | Kim | ...................... | H01M 2/206 |
| 2006/0138197 A1* | 6/2006 | Aota | .................. | B23K 20/1255 228/112.1 |
| 2007/0187469 A1* | 8/2007 | Chen | .................... | B23K 20/122 228/112.1 |
| 2007/0296249 A1* | 12/2007 | Tao | ......................... | B21D 19/12 296/29 |
| 2008/0048005 A1* | 2/2008 | Forrest | ................ | B23K 20/1225 228/101 |
| 2008/0173696 A1* | 7/2008 | Gendou | ................. | B21J 15/025 228/112.1 |
| 2008/0256779 A1* | 10/2008 | Ryu | ...................... | B21D 39/021 29/505 |
| 2009/0266936 A1* | 10/2009 | Fernandez | ............... | B64C 1/061 244/119 |
| 2010/0043612 A1* | 2/2010 | Ichiyanagi | ............... | G01N 1/06 83/105 |
| 2010/0089976 A1* | 4/2010 | Szymanski | .......... | B23K 20/122 228/113 |
| 2010/0310897 A1* | 12/2010 | Takaki | ................. | B62D 29/007 428/586 |
| 2011/0099808 A1* | 5/2011 | Imamura | ............. | H01H 11/041 29/882 |
| 2011/0104515 A1* | 5/2011 | Kou | .................... | B23K 20/1265 428/649 |
| 2011/0169303 A1* | 7/2011 | Ikeda | ...................... | B60R 21/34 296/193.11 |
| 2013/0148689 A1* | 6/2013 | Yahaba | .................. | G01N 25/72 374/5 |
| 2014/0217777 A1* | 8/2014 | Tanaka | .................... | B62D 25/20 296/187.09 |
| 2014/0294489 A1* | 10/2014 | Sakai | ..................... | B62D 25/02 403/267 |
| 2015/0000956 A1* | 1/2015 | Spinella | ................. | B23K 11/20 174/126.2 |
| 2015/0174702 A1* | 6/2015 | Fujimoto | ............. | B23K 11/115 428/594 |
| 2016/0244103 A1* | 8/2016 | Amemiya | ............. | B62D 21/00 |

FOREIGN PATENT DOCUMENTS

| | | | | |
|---|---|---|---|---|
| JP | 2004136316 A | * | 5/2004 | |
| JP | 2005088012 A | * | 4/2005 | |
| JP | 2005239029 A | * | 9/2005 | |
| JP | 2007030043 A | * | 2/2007 | |
| JP | 2007083295 A | * | 4/2007 | |
| JP | 2007-289976 A | | 11/2007 | |
| JP | 2008006451 A | * | 1/2008 | |
| JP | 2008119743 A | * | 5/2008 | |
| JP | 4577620 B2 | * | 11/2010 | |
| JP | 4940743 B2 | * | 5/2012 | ............. H01L 24/36 |
| JP | 4998027 B2 | * | 8/2012 | |
| JP | WO 2015097727 A1 | * | 7/2015 | ......... B23K 20/1245 |

\* cited by examiner

FRICTION STIR SPOT WELDING STRUCTURE

CROSS-REFERENCE TO RELATED APPLICATION

This application is based on and claims priority under 35 USC 119 from Japanese Patent Application No. 2014-266274 filed on Dec. 26, 2014, the disclosure of which is incorporated by reference herein.

BACKGROUND

Technical Field

The present invention relates to a friction stir spot welding structure.

Related Art

Friction stir welding is known as a joining method in which a pair of panel members are joined together in a overlapped state (see, for example, Japanese Patent Application Laid-Open (JP-A) No. 2007-289976). Friction stir spot welding is also known as a similar type of joining method to friction stir welding.

In friction stir spot welding (FSSW or SFSW (spot friction stir welding)), first, the pair of mutually overlapped panel members are gripped by a clamp. Next, a rotating pin projecting out from a leading end of a tool is pressed, while rotating, against one panel member of the pair of panel members. A joint portion of the pair of panel members is softened by frictional heat accompanying the friction with the rotating pin, and the softened joint portion is stirred (plastic flow) by the rotating pin so as to become an integral unit.

There is a possibility of cracks, buckling, and the like occurring in the panel member if the panel member being pressed by the rotating pin follows the rotation of the rotating pin while this is being performed.

SUMMARY

In consideration of the above circumstances, an object of the present invention is to provide a friction stir spot welding structure capable of suppressing cracks and the like from occurring in a panel member pressed by a rotating pin.

A friction stir spot welding structure according to a first aspect includes a pair of panel members that are friction stir spot welded together by being pressed from one thickness direction side by a rotating pin rotating at a mutually overlapping location, and a rotation restricting section that restricts relative rotation of the pair of panel members about a rotation axis of the rotating pin.

In the friction stir spot welding structure according to the first aspect, the pair of panel members are friction stir spot welded together by being pressed from one thickness direction side by the rotating pin at a mutually overlapping location. If one panel member that is pressed by the rotating pin was to follow the rotation of the rotating pin and rotate relative to the other panel member when this is performed, there would be a possibility that cracks, buckling, and the like occur in this panel member.

To address this, in the first aspect, when the one panel member attempts to follow the rotation of the rotating pin and to rotate relative to the other panel member, the one panel member is restricted from rotating relative to the other panel member by the rotation restricting section. Namely, the pair of panel members are restricted from relative rotation about the rotation axis of the rotating pin by the rotation restricting section. Since the panel member pressed by the rotating pin is thereby suppressed from following the rotation of the rotating pin, cracks, buckling, and the like are thereby suppressed from occurring in this panel member.

A friction stir spot welding structure according to a second aspect is the friction stir spot welding structure described in the first aspect, wherein the rotation restricting section includes a first engagement portion that is formed at one of the panel members of the pair of panel members and that projects out from the one panel member toward the other panel member, and a second engagement portion that is formed at the other panel member of the pair of panel members and that engages with the first engagement portion in a rotation direction of the rotating pin.

In the friction stir spot welding structure according to the second aspect, the one panel member of the pair of panel members is formed with the first engagement portion that projects out toward the other panel member. The other panel member is formed with the second engagement portion that engages with the first engagement portion in the rotation direction of the rotating pin.

Thus in cases in which, for example, the one panel member is pressed by the rotating pin, and attempts to follow the rotation of the rotating pin and to rotate with respect to the other panel member, the first engagement portion and the second engagement portion engage with each other in the rotation direction of the rotating pin. Similarly, in cases in which the other panel member is pressed by the rotating pin, and attempts to follow the rotation of the rotating pin and to rotate with respect to the one panel member, the first engagement portion and the second engagement portion engage with each other in the rotation direction of the rotating pin. The pair of panel members are thereby restricted from relative rotation about the rotation axis of the rotating pin. Since the panel member pressed by the rotating pin is thereby suppressed from following the rotation of the rotating pin, cracks, buckling, and the like are thereby suppressed from occurring in this panel member.

A friction stir spot welding structure according to a third aspect is the friction stir spot welding structure of the second aspect, wherein: one of the panel members of the pair of panel members includes a panel main body section, and a flange portion that extends out from an end portion of the panel main body section, that is overlapped with the other panel member, and that is pressed by the rotating pin; and the rotation restricting section is disposed further toward an extension direction leading end side of the flange portion than a center of a joint portion between the flange portion and the other panel member.

In the friction stir spot welding structure according to the third aspect, the one panel member of the pair of panel members includes the panel main body section and the flange portion that extends out from the end portion of the panel main body section. The flange portion is overlapped with the other panel member of the pair of panel members. The rotating pin that rotates is pressed against the flange portion. The flange portion of the one panel member, and the other panel member, are thereby friction stir spot welded together.

Note that if the flange portion was to follow the rotation of the rotating pin accompanying friction stir spot welding, a large strain would be more liable to occur in the flange portion at a location at the extension direction leading end side of the flange portion than at a location at the panel main body section side, with respect to the center of the joint portion with the other panel member.

To address this, in the present aspect, the rotation restricting section is disposed further to the extension direction leading end side of the flange portion than the center of the joint portion between the flange portion and the other panel member. Strain occurring in the flange portion further to the extension direction leading end side of the flange portion than the center of the joint portion is thereby effectively reduced. Cracks, buckling, and the like are thereby suppressed from occurring at the flange portion pressed by the rotating pin.

A friction stir spot welding structure according to a fourth aspect is the friction stir spot welding structure of the third aspect, wherein the rotation restricting section is disposed on both sides of a hypothetical reference line that passes through the center of the joint portion and extends along the extension direction of the flange portion.

In the friction stir spot welding structure according to the fourth aspect, the rotation restricting section is disposed on both sides of the hypothetical reference line that passes through the center of the joint portion and extends along the extension direction of the flange portion. The flange portion and the other panel member are thereby restricted from relative rotation on both sides of the hypothetical reference line, such that strain occurring in the flange portion further to the extension direction leading end side of the flange portion than the center of the joint portion is effectively reduced. Cracks, buckling, and the like are thereby further suppressed from occurring at the flange portion pressed by the rotating pin.

A friction stir spot welding structure according to a fifth aspect is the friction stir spot welding structure of the third aspect or the fourth aspect, wherein the rotation restricting section is disposed on a hypothetical sloped line sloping, with respect to a hypothetical reference line that passes through the center of the joint portion and extends along the extension direction of the flange portion, at 45 degrees from the center of the joint portion toward an end portion at the extension direction leading end side of the flange portion.

In the friction stir spot welding structure according to the fifth aspect, the rotation restricting section is disposed on the hypothetical sloped line sloping, with respect to the hypothetical reference line that passes through the center of the joint portion and extends along the extension direction of the flange portion, at 45 degrees from the center of the joint portion toward the end portion at the extension direction leading end side of the flange portion.

If the flange portion was to follow the rotation of the rotating pin accompanying friction stir spot welding, strain would concentrate at a location of the end portion at the extension direction leading end side of the flange portion intersected by the hypothetical sloped line, and cracks, buckling, and the like would be more liable to occur at this location.

To address this, in the present aspect, the rotation restricting section is disposed on the hypothetical sloped line described above. Strain occurring at the location at the end portion of the flange portion intersected by the hypothetical sloped line is thereby effectively reduced. Cracks, buckling, and the like are thereby further suppressed from occurring at the end portion of the flange portion pressed by the rotating pin.

A friction stir spot welding structure according to a sixth aspect is the friction stir spot welding structure of any one of the second aspect to the fifth aspect, wherein the first engagement portion includes a protruding portion that is formed at one panel member of the pair of panel members and that projects in a protruding shape from the one panel member toward the other panel member, and the second engagement portion includes an engagement hole that is formed at the other panel member of the pair of panel members and into which the protruding portion is inserted.

In the friction stir spot welding structure according to the sixth aspect, the one panel member of the pair of panel members is formed with the protruding portion. The protruding portion projects in a protruding shape from the one panel member toward the other panel member, and is inserted into the engagement hole formed at the other panel member.

In cases in which, for example, the one panel member is pressed by the rotating pin, and attempts to follow the rotation of the rotating pin and to rotate relative to the other panel member in this state, the protruding portion engages with a peripheral edge portion of the engagement hole. Similarly, in cases in which the other panel member is pressed by the rotating pin, and attempts to follow the rotation of the rotating pin and to rotate relative to the one panel member, the protruding portion engages with the peripheral edge portion of the engagement hole. The pair of panel members are thereby restricted from relative rotation about the rotation axis of the rotating pin. The panel member pressed by the rotating pin is suppressed from following the rotation of the rotating pin, such that cracks, buckling, and the like are thereby suppressed from occurring in this panel member.

A friction stir spot welding structure according to a seventh aspect is the friction stir spot welding structure of any one of the second aspect to the sixth aspect, wherein the first engagement portion includes a rib portion that is formed along an end portion of one panel member of the pair of panel members and that extends out from the end portion toward the other panel member, and the second engagement portion includes a cutout portion that is formed at an end portion of the other panel member of the pair of panel members and into which the rib portion is inserted.

In the friction stir spot welding structure according to the seventh aspect, the end portion of the one panel member of the pair of panel members is formed with the rib portion. The rib portion is formed along the end portion of the one panel member, extends out from the end portion toward the other panel member, and is inserted into the cutout portion formed at the end portion of the other panel member.

In cases in which, for example, the one panel member is pressed by the rotating pin, and attempts to follow the rotation of the rotating pin and to rotate relative to the other panel member in this state, the rib portion engages with a peripheral edge portion of the cutout portion. Similarly, in cases in which the other panel member is pressed by the rotating pin, and attempts to follow the rotation of the rotating pin and to rotate relative to the one panel member, the rib portion engages with the peripheral edge portion of the cutout portion. The pair of panel members are thereby restricted from relative rotation about the rotation axis of the rotating pin. The panel member pressed by the rotating pin is suppressed from following the rotation of the rotating pin, such that cracks, buckling, and the like are thereby suppressed from occurring in this panel member.

The rib portion is formed along the end portion of the one panel member. The end portion of the one panel member is reinforced by the rib portion. Forming the rib portion at the end portion of the panel member pressed by the rotating pin thereby reduces strain occurring at the end portion of this panel member.

As explained above, the friction stir spot welding structure according to the present invention enables cracks and the like to be suppressed from occurring in a panel member pressed by a rotating pin.

BRIEF DESCRIPTION OF THE DRAWINGS

Exemplary embodiments of the present invention will be described in detail based on the following figures, wherein.

DETAILED DESCRIPTION

Explanation follows regarding a friction stir spot welding structure according to an exemplary embodiment of the present invention, with reference to the drawings. Note that the arrow FR indicates the vehicle front-rear direction front side in each of the drawings as appropriate. The arrow UP indicates the vehicle up-down direction upper side. The arrow OUT indicates the vehicle width direction outside (vehicle body left side).

Figure 1:
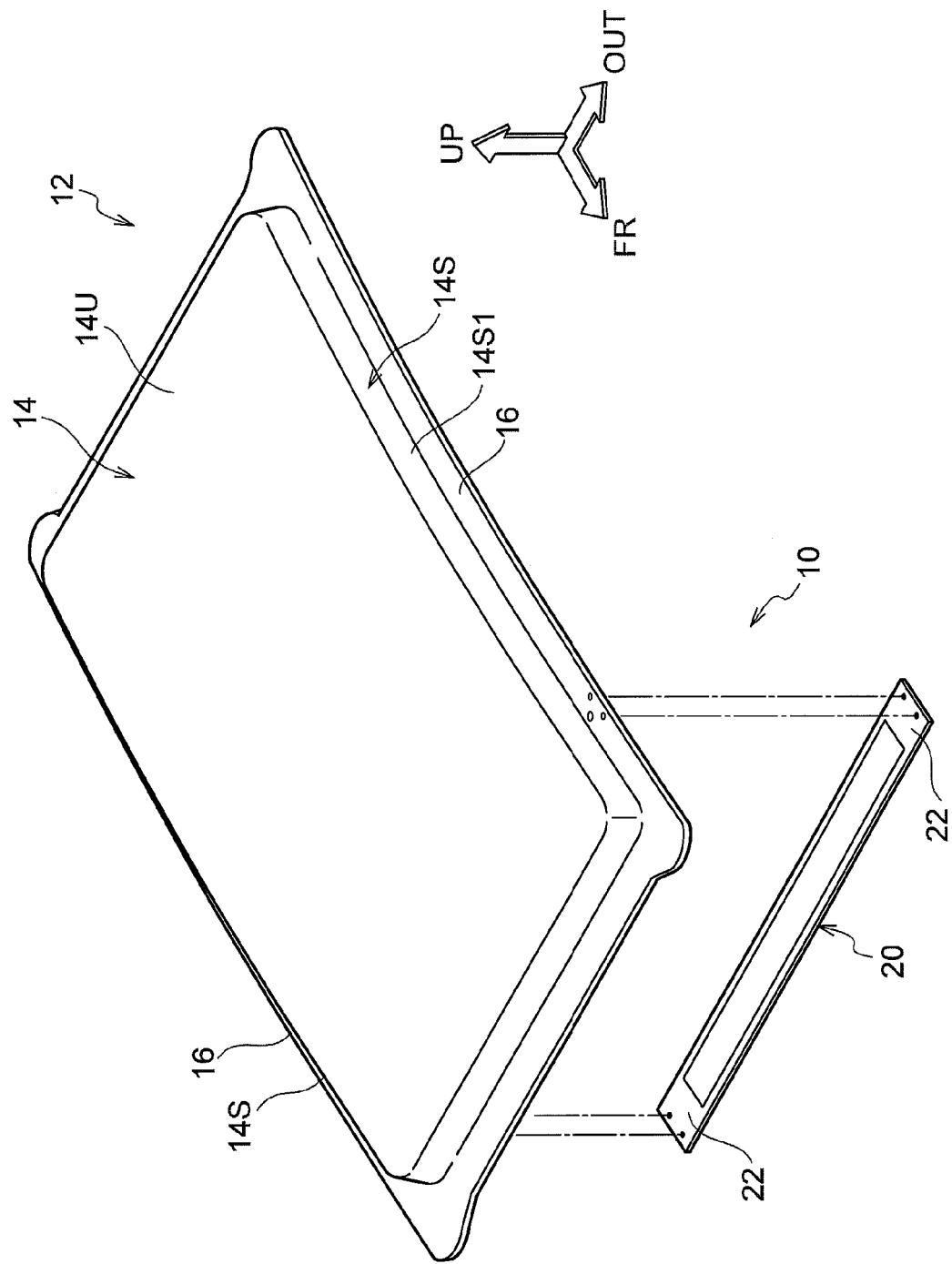
FIG. 1 is an exploded perspective view illustrating a roof panel and roof panel reinforcement applied with a friction stir spot welding structure according to an exemplary embodiment.

As illustrated in FIG. 1, a friction stir spot welding structure 10 according to the exemplary embodiment is applied, for example, to a roof panel 12 and roof panel reinforcement 20. The roof panel 12 is a metal panel member made of aluminum or the like, configuring an outer panel of a roof of a vehicle. The roof panel 12 is disposed along the vehicle front-rear direction and the vehicle width direction, and spans across a pair of left and right roof side rails, not illustrated in the drawings.

The roof panel 12 includes a panel main body section 14, and a pair of left and right flange portions 16. The panel main body section 14 is formed in a flattened box shape that opens downward. The panel main body section 14 includes an upper wall portion 14U, and a pair of side wall portions 14S extending downward from end portions at both vehicle width direction sides of the upper wall portion 14U. The flange portions 16 are respectively provided at lower side end portions 14S1 of the pair of side wall portions 14S. The end portion 14S1 of each side wall portion 14S is an example of an end portion of the panel main body section 14.

Figure 2:
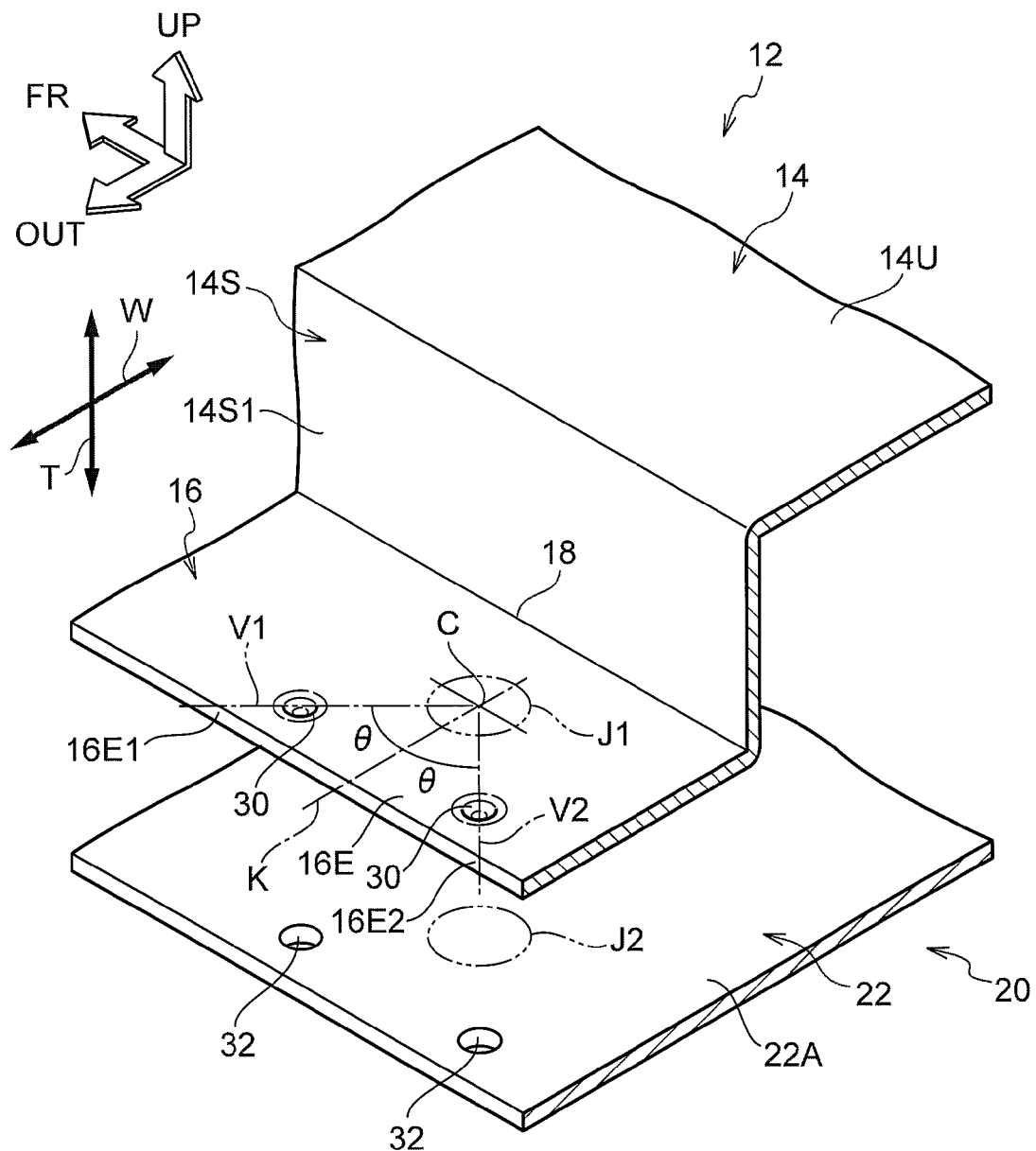
FIG. 2 is an enlarged exploded perspective view illustrating an upper side flange portion of the roof panel and a lower side flange portion of the roof panel reinforcement illustrated in FIG. 1.

As illustrated in FIG. 2, each flange portion 16 extends in the vehicle front-rear direction along the end portion 14S1 of the side wall portion 14S, and extends out from the end portion 14S1 toward the vehicle width direction outside. The flange portion 16 is bent with respect to the side wall portion 14S. A ridge line 18 is thereby formed at a boundary portion between the flange portion 16 and the side wall portion 14S (panel main body section 14).

The roof panel reinforcement (hereafter simply referred to as "reinforcement") 20 is joined to the roof panel 12, and is a metal panel member made of aluminum or the like that reinforces the roof panel 12. The reinforcement 20 is, for example, disposed with its length direction along the vehicle width direction at a vehicle front-rear direction front portion of the roof panel 12, and spans across the pair of flange portions 16 of the roof panel 12.

Length direction end portions of the reinforcement 20 configure flange portions 22 that are joined to the flange portions 16 of the roof panel 12. Specifically, each flange portion 22 of the reinforcement 20 is joined by friction stir spot welding to the respective flange portion 16 of the roof panel 12 in a state overlapped with a lower face of the flange portion 16.

Specific explanation follows regarding the joint structure between the flange portion 16 of the roof panel 12 and the flange portion 22 of the reinforcement 20. In the explanation below, for ease of explanation, the flange portion 16 of the roof panel 12 is referred to as an upper side flange portion 16, and the flange portion 22 of the reinforcement 20 is referred to as a lower side flange portion 22.

A pair of protruding portions 30, serving as an example of a first engagement portion (a rotation restricting section), are formed to the upper side flange portion 16 at the periphery of a joint portion J1 to the lower side flange portion 22. Note that the joint portion J1 of the upper side flange portion 16 refers to a circular shaped location of the upper side flange portion 16 that is joined to the lower side flange portion 22 by friction stir spot welding. The outer profile of the joint portion (anticipated joint portion) J1 prior to joining to the lower side flange portion 22 is illustrated by a double-dotted dashed line in FIG. 2. The outer profile of a joint portion (anticipated joint portion) J2 of the lower side flange portion 22 to the upper side flange portion 16 is also illustrated by a double-dotted dashed line in FIG. 2.

The pair of protruding portions 30 project out in a protruding shape from the upper side flange portion 16 toward the lower side flange portion 22. Each protruding portion 30 is formed in a circular shape as viewed from the thickness direction of the upper side flange portion 16 (the arrow T direction). The pair of protruding portions 30 are formed at the upper side flange portion 16 by press-forming (embossing), for example.

Figure 3:
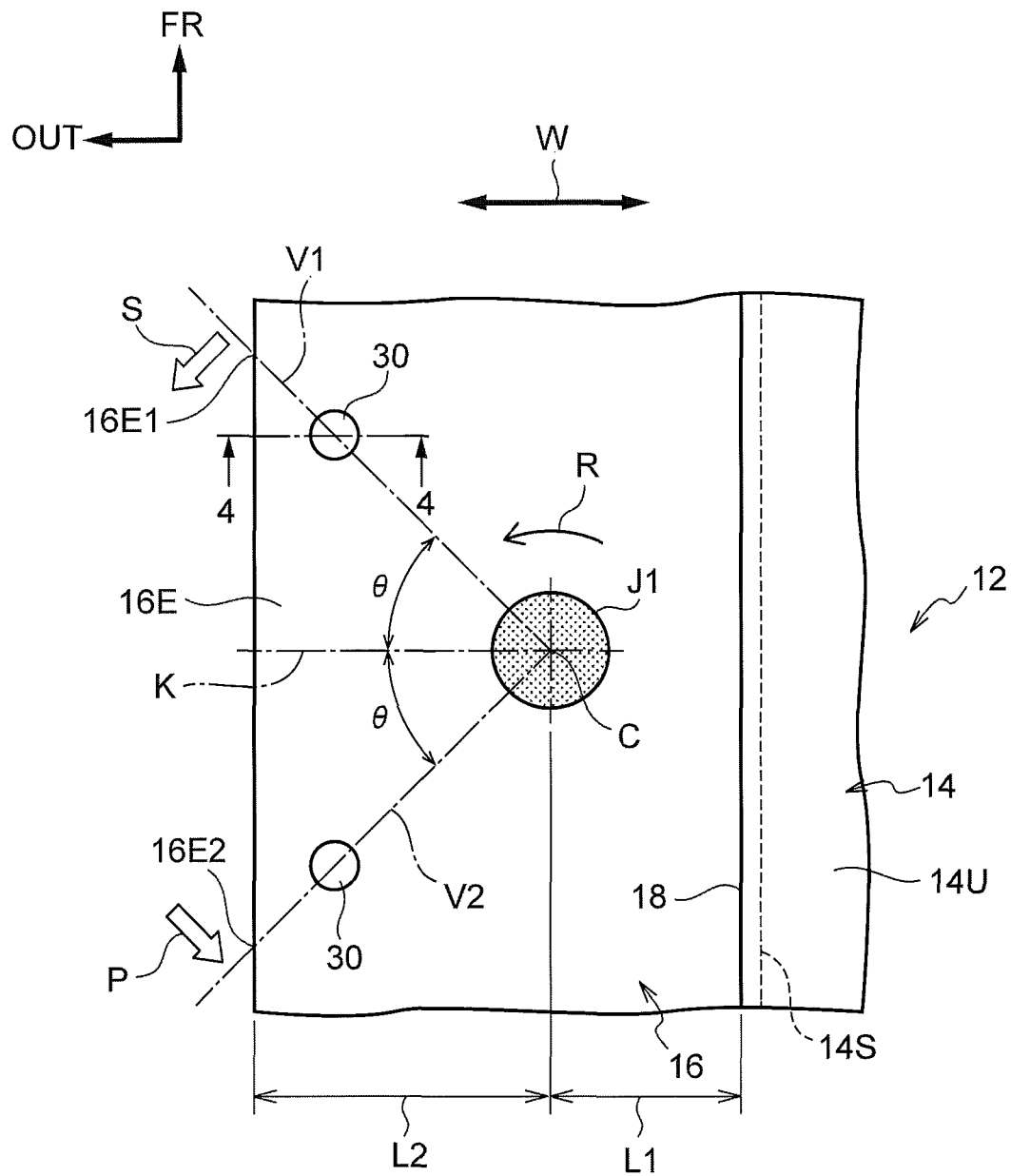
FIG. 3 is a plan view of the upper side flange portion of the roof panel illustrated in FIG. 2, viewed from the vehicle up-down direction upper side.

As illustrated in FIG. 3, the pair of protruding portions 30 are disposed further to an extension direction leading end side of the upper side flange portion 16 (the arrow OUT side) than a center C of the joint portion J1. Specifically, the pair of protruding portions 30 are formed at a location L2 of the upper side flange portion 16, where L1 is a location (region) further to the panel main body section 14 side than the center C of the joint portion J1, and L2 is a location (region) further to the extension direction leading end side of the upper side flange portion 16 than the center C of the joint portion J1, in the upper side flange portion 16. Note that the extension direction of the upper side flange portion 16 is aligned with the width direction of the upper side flange portion 16 (the arrow W direction). The outer profile of the joint portion J1 after joining to the lower side flange portion 22 is illustrated by a solid line in FIG. 3.

The pair of protruding portions 30 are disposed on both sides of a hypothetical reference line K that passes through the center C of the joint portion J1 and extends along the extension direction (width direction) of the upper side flange portion 16. More specifically, the pair of protruding portions 30 are disposed on hypothetical sloped lines V1, V2 that each slope at a slope angle θ (θ=45 degrees) with respect to the hypothetical reference line K, from the center C of the joint portion J1 toward an end portion 16E at the extension direction leading end side of the upper side flange portion 16. Note that in the present exemplary embodiment, the hypothetical reference line K intersects the leading end of the end portion 16E of the upper side flange portion 16 perpendicularly or substantially perpendicularly thereto.

Figure 4:
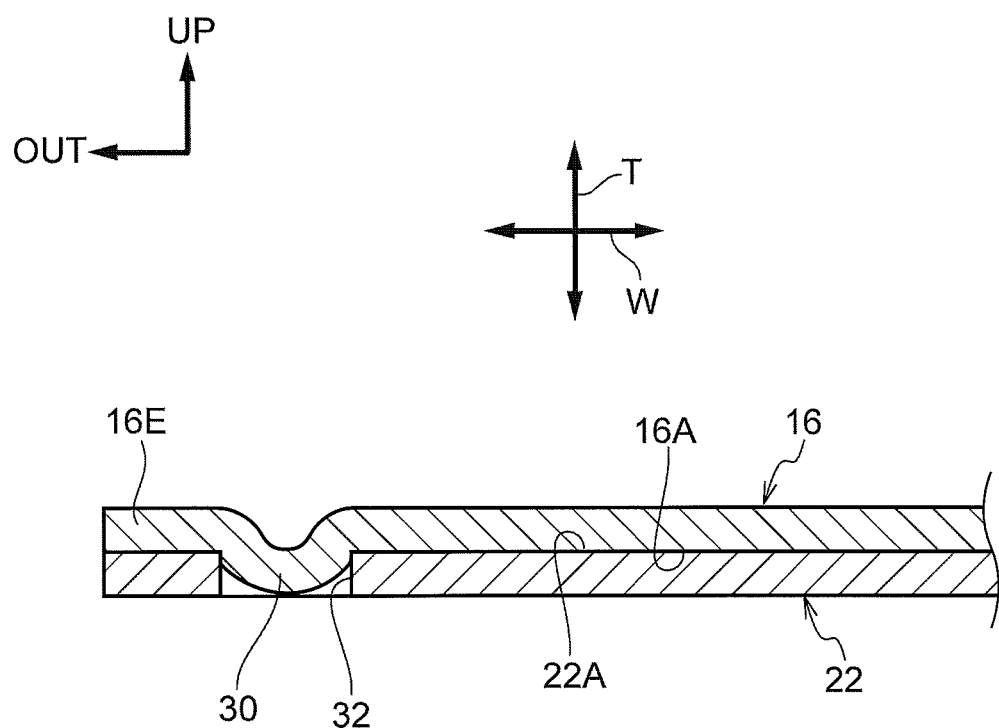
FIG. 4 is a cross-section taken along line 4-4 in FIG. 3.

As illustrated in FIG. 2, the pair of protruding portions 30 are respectively inserted into a pair of engagement holes 32 formed at the lower side flange portion 22. The pair of engagement holes 32, serving as an example of a second engagement portion (rotation restricting section), are configured by circular shaped through-holes that pierce through the thickness direction of the lower side flange portion 22 (the arrow T direction). The pair of engagement holes 32 are formed at locations of the lower side flange portion 22 that face the pair of protruding portions 30. The diameter of each engagement hole 32 is slightly larger than the outer profile of the protruding portion 30. As illustrated in FIG. 4, the protruding portions 30 are accordingly fitted into the engagement holes 32 in a state in which a surface (lower face) 16A of the upper side flange portion 16 and a surface (upper face) 22A of the lower side flange portion 22 are in close contact.

Explanation follows regarding advantageous effects of the present exemplary embodiment, while explaining an example of a joint method between the upper side flange portion 16 and the lower side flange portion 22.

First, as illustrated in FIG. 4, the upper side flange portion 16 is overlapped with the lower side flange portion 22. When this is performed, the pair of protruding portions 30 of the upper side flange portion 16 are respectively fitted into the pair of engagement holes 32 of the lower side flange portion 22. The upper side flange portion 16 and the lower side flange portion 22 are thereby positioned. Relative rotation of the upper side flange portion 16 and the lower side flange portion 22 about a rotation axis O of a rotating pin 46, described later, is restricted by fitting the pair of protruding portions 30 into the respective pair of engagement holes 32. Note that only one protruding portion 30 out of the pair of protruding portions 30 is illustrated in FIG. 4.

Figure 5:
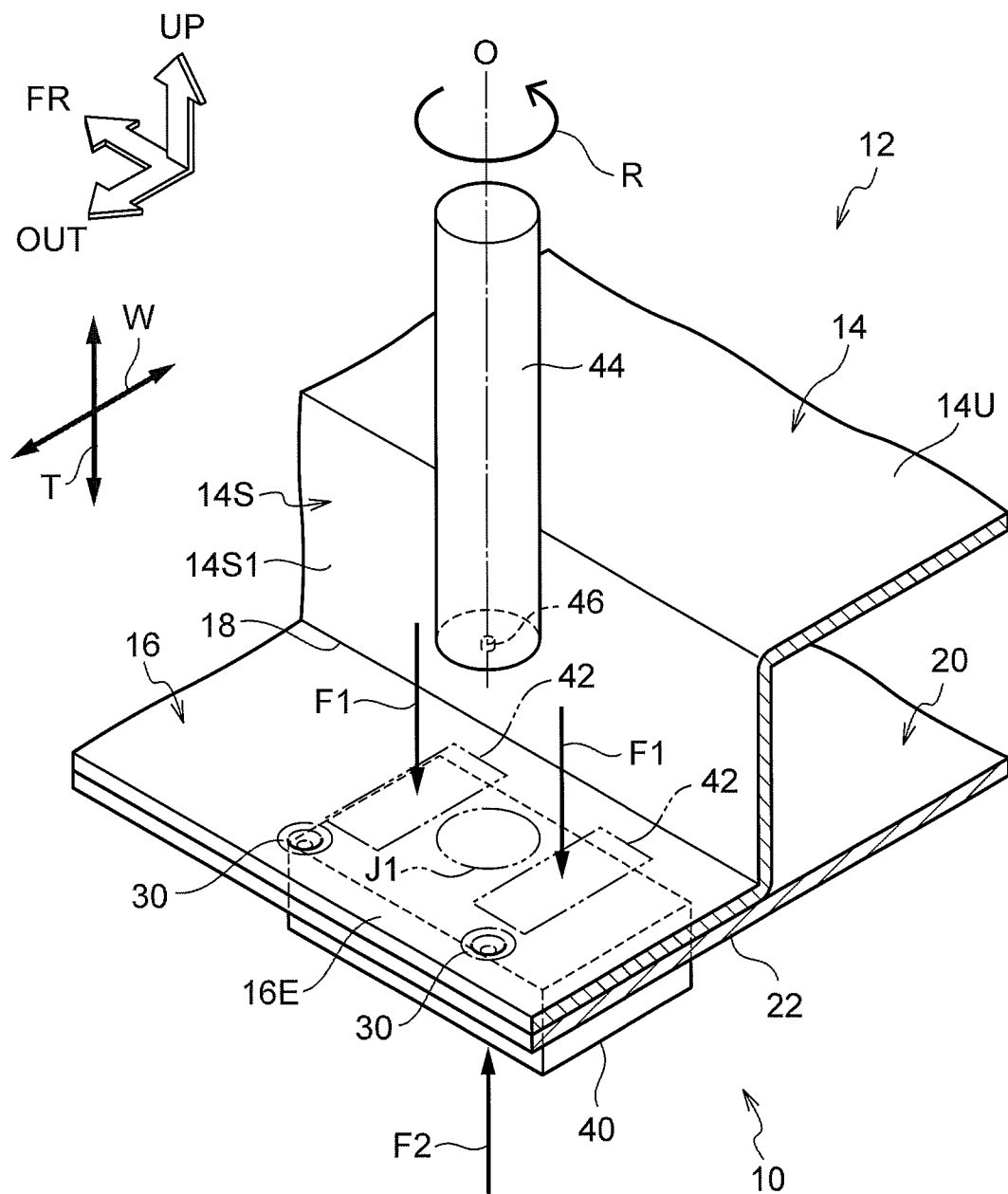
FIG. 5 is a perspective view illustrating a overlapped state of the upper side flange portion of the roof panel and the lower side flange portion of the roof panel reinforcement illustrated in FIG. 2.

Next, as illustrated in FIG. 5, the joint portions J1, J2 (see FIG. 2) of the upper side flange portion 16 and the lower side flange portion 22 are mounted on a backing material (backing metal) 40. Next, a pair of clamps 42 are pressed against both sides of the joint portion J1 of the upper side flange portion 16 (both length direction sides of the upper side flange portion 16). The upper side flange portion 16 and the lower side flange portion 22 are thereby gripped and fixed between the pair of clamps 42 and the backing material 40.

Note that contact portions of the upper side flange portion 16 to the pair of clamps 42 are illustrated by double-dotted dashed lines in FIG. 5. The pressing force (clamp load) of the pair of clamps 42 is illustrated by the arrows F1, and the reaction force of the backing material 40 against the pressing force of the pair of clamps 42 is illustrated by the arrow F2 in FIG. 5.

In this state, the rotating pin (probe) 46 that projects out from, and rotates together with, a leading end of a circular column shaped tool 44 is pressed against the joint portion J1 of the upper side flange portion 16 substantially perpendicularly thereto. Thus the joint portions J1, J2 of the upper side flange portion 16 and the lower side flange portion 22 (see FIG. 2) are softened by frictional heat accompanying friction with the rotating pin 46, and the softened joint portions J1, J2 are stirred (plastic flow) by the rotating pin 46 so as become an integral unit. The upper side flange portion 16 and the lower side flange portion 22 are joined together by curing the joint portions J1, J2 in this state.

The rotating pin 46 rotates in the arrow R direction about the rotation axis O that is substantially perpendicular to the joint portions J1, J2. When the rotating pin 46 is pressed against the joint portion J1 of the upper side flange portion 16, the rotation force of the rotating pin 46 (force in the arrow R direction) is transmitted to the upper side flange portion 16. When this rotation force exceeds the friction force caused by the pressing force (arrows F1, F2) of the pair of clamps 42 and occurring between the surfaces 16A, 22A of the upper side flange portion 16 and the lower side flange portion 22 (see FIG. 4), the upper side flange portion 16 is offset (slides) in the rotation direction of the rotating pin 46 with respect to the lower side flange portion 22, and the upper side flange portion 16 attempts to follow the rotation of the rotating pin 46. If the upper side flange portion 16 was to follow the rotation of the rotating pin 46, the strain occurring at the end portion 16E of the upper side flange portion 16 would become large, and there would be a possibility that cracks, buckling, and the like occur at the end portion 16E.

To address this, in the present exemplary embodiment, the pair of protruding portions 30 of the upper side flange portion 16 are respectively fitted into the pair of engagement holes 32 of the lower side flange portion 22. Thus, when the upper side flange portion 16 attempts to follow the rotation of the rotating pin 46 and to rotate in the rotation direction of the rotating pin 46 with respect to the lower side flange portion 22, the pair of protruding portions 30 respectively engage with peripheral edge portions of the pair of engagement holes 32. The pair configured of the upper side flange portion 16 and the lower side flange portion 22 are thereby restricted from relative rotation about the rotation axis O of the rotating pin 46. Since the upper side flange portion 16 is suppressed from following the rotation of the rotating pin 46, cracks, buckling, and the like are thereby suppressed from occurring in the end portion 16E of the upper side flange portion 16.

If the upper side flange portion 16 was to follow the rotation of the rotating pin 46, as illustrated in FIG. 3, a large strain would be more liable to occur in the upper side flange portion 16 at the location L2 at the extension direction leading end side of the upper side flange portion 16 than at the location L1 at the panel main body section 14 side with respect to the center C of the joint portion J1.

To address this, in the present exemplary embodiment, the pair of protruding portions 30 are disposed further to the extension direction leading end side of the upper side flange portion 16 than the center C of the joint portion J1. More specifically, the pair of protruding portions 30 are formed at the location L2 of the upper side flange portion 16. The pair of protruding portions 30 are disposed on both sides of the hypothetical reference line K. Strain occurring at the location L2 of the upper side flange portion 16 is thereby effectively reduced. Cracks, buckling, and the like are thereby further suppressed from occurring at the end portion 16E of the upper side flange portion 16.

If the upper side flange portion 16 was to follow the rotation of the rotating pin 46 (the arrow R direction), tensile strain caused by a tensile force S would occur at a location 16E1 of the end portion 16E of the upper side flange portion 16 intersected by the hypothetical sloped line V1. Compression strain caused by a compression force P would occur at a location 16E2 of the end portion 16E of the upper side flange portion 16 intersected by the hypothetical sloped line V2. The tensile strain and the compression strain are liable to be large when the slope angles θ of the pair of hypothetical sloped lines V1, V2 are each 45 degrees with respect to the hypothetical reference line K. In the present exemplary embodiment, when the upper side flange portion 16 follows the rotation of the rotating pin 46, cracks, buckling, and the like are thereby more liable to occur in the end portion 16E of the upper side flange portion 16 at the locations 16E1, 16E2.

As a countermeasure thereto, in the present exemplary embodiment, the pair of protruding portions 30 are disposed on the pair of hypothetical sloped lines V1, V2. Tensile strain and compression strain occurring at the locations 16E1, 16E2 of the end portion 16E of the upper side flange portion 16 are thereby effectively reduced. Cracks, buckling, and the like are thereby further suppressed from occurring at the end portion 16E of the upper side flange portion 16.

In the present exemplary embodiment, the pair of protruding portions 30 are respectively fitted into the pair of engagement holes 32 when the upper side flange portion 16 is overlapped with the lower side flange portion 22. The upper side flange portion 16 and the lower side flange portion 22 are positioned accordingly. This accordingly facilitates positioning of the upper side flange portion 16 and the lower side flange portion 22 during friction stir spot welding of the upper side flange portion 16 and the lower side flange portion 22.

Explanation follows regarding modified examples of the above exemplary embodiment.

In the above exemplary embodiment, the rotation restricting section is configured by the pair of protruding portions 30 and the pair of engagement holes 32; however, the rotation restricting section is not limited thereto.

Figure 6:
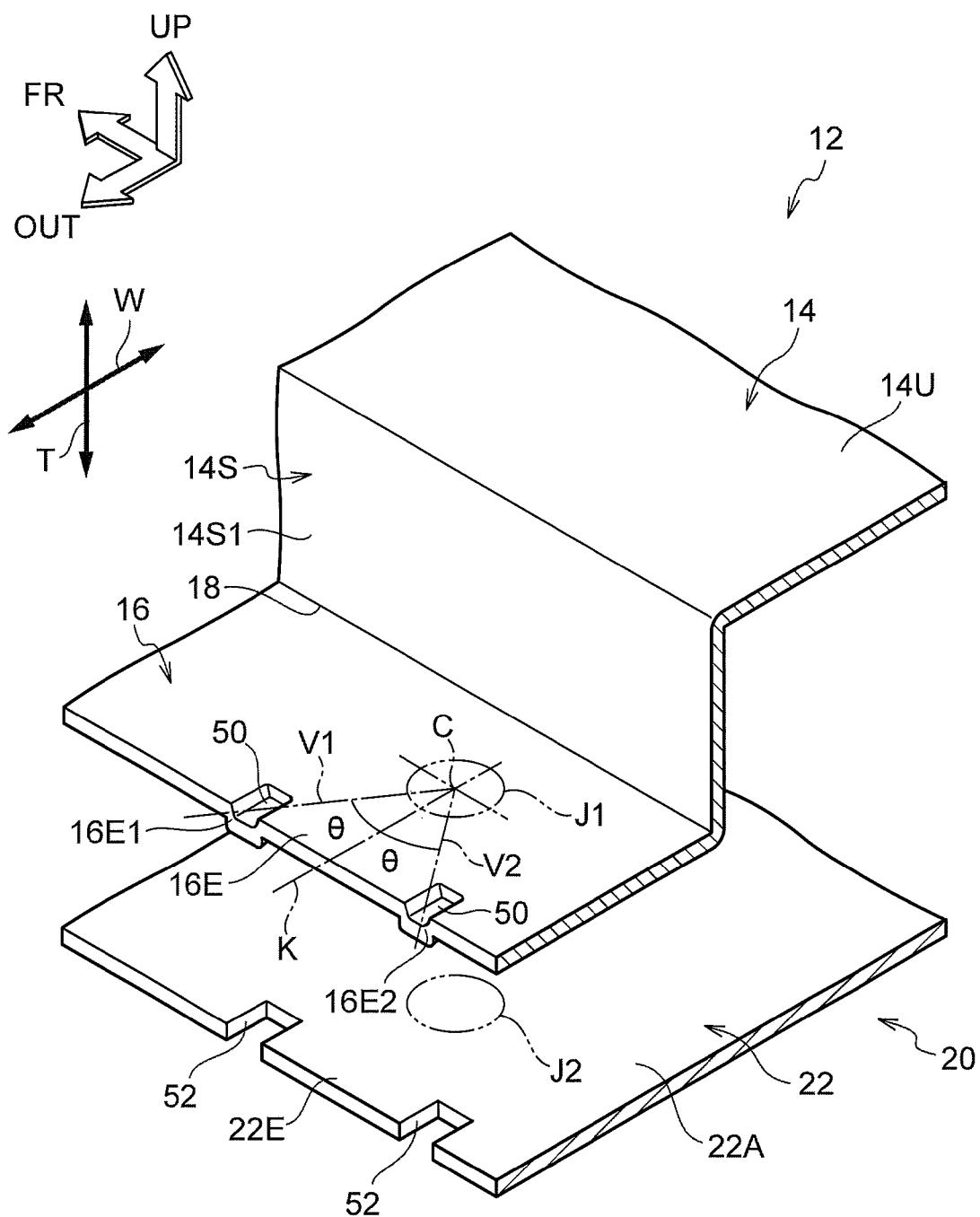
FIG. 6 is an exploded perspective view corresponding to FIG. 2, illustrating an upper side flange portion of a roof panel and a lower side flange portion of roof panel reinforcement applied with a modified example of a friction stir spot welding structure according to an exemplary embodiment.

In the modified example illustrated in FIG. 6, for example, a pair of protruding portions 50 are formed at the end portion 16E of the upper side flange portion 16. The pair of protruding portions 50 are formed at the upper side flange portion 16 by press-forming, for example, and project out in a protruding shape from the upper side flange portion 16 toward the lower side flange portion 22. Each protruding portion 50 is formed in a rectangular shape as viewed from the thickness direction of the upper side flange portion 16 (the arrow T direction). Each protruding portion 50 reaches a leading end of the end portion 16E of the upper side flange portion 16. The pair of protruding portions 50 are respectively inserted into a pair of cutout portions 52 formed at the lower side flange portion 22.

Figure 7:
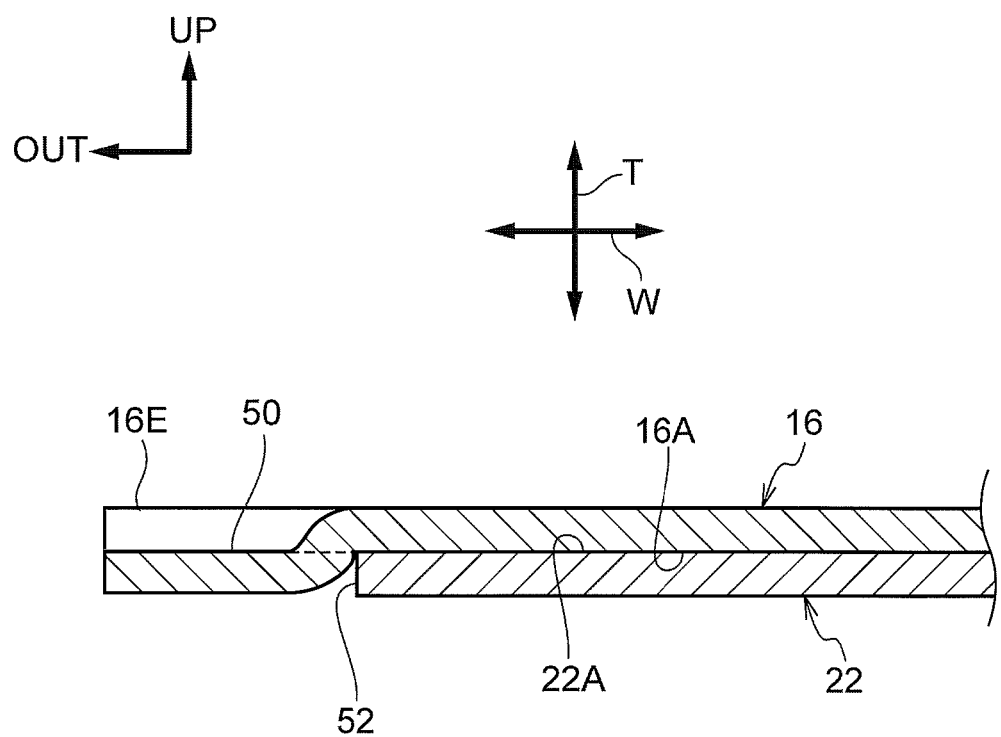
FIG. 7 is cross-section view illustrating the state illustrated in FIG. 6, in which a protruding portion is fitted into a cutout portion.

The pair of cutout portions 52 are formed at locations of the lower side flange portion 22 facing the pair of protruding portions 50. Each cutout portion 52 is formed by cutting a rectangular shape out of an end portion 22E of the lower side flange portion 22. As illustrated in FIG. 7, the protruding portions 50 are fitted into the cutout portions 52 in a state in which the surface 16A of the upper side flange portion 16 and the surface 22A of the lower side flange portion 22 are in close contact with each other. The upper side flange portion 16 and the lower side flange portion 22 are joined together by friction stir spot welding in this state. Note that the pair of protruding portions 50 are an example of a first engagement portion (rotation restricting section), and the pair of cutout portions 52 are an example of a second engagement portion (rotation restricting section).

When the upper side flange portion 16 attempts to follow the rotation of the rotating pin 46 (see FIG. 5), and to rotate in the rotation direction of the rotating pin 46 with respect to the lower side flange portion 22 accompanying friction stir spot welding, the protruding portions 50 engage with peripheral edge portions of the cutout portions 52. The upper side flange portion 16 and the lower side flange portion 22 are thereby restricted from relative rotation about the rotation axis O of the rotating pin 46. Similar advantageous effects to the above exemplary embodiment can accordingly be obtained.

Figure 8:
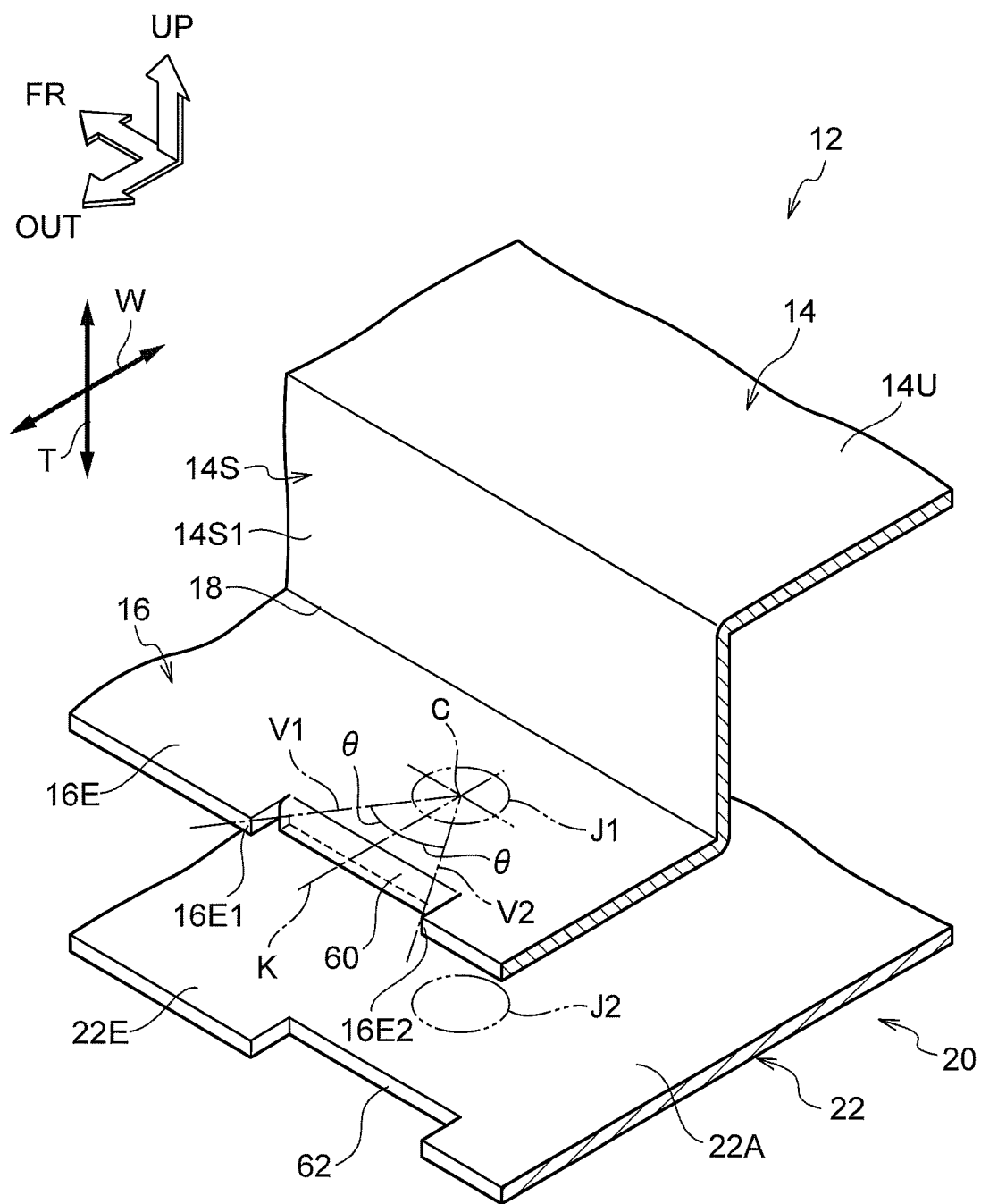
FIG. 8 is an exploded perspective view corresponding to FIG. 2, illustrating an upper side flange portion of a roof panel and a lower side flange portion of roof panel reinforcement applied with a modified example of a friction stir spot welding structure according to an exemplary embodiment.

In the modified example illustrated in FIG. 8, a rib portion (reinforcement rib portion) 60 is formed at the end portion 16E of the upper side flange portion 16. The rib portion 60 is formed along the end portion 16E of the upper side flange portion 16. The rib portion 60 is formed by cutting and pressing out (cut-and-press working) the end portion 16E of the upper side flange portion 16 toward the lower side flange portion 22 side. The rib portion 60 cuts across both of the pair of hypothetical sloped lines V1, V2. Locations 16E1, 16E2 of the end portion 16E of the upper side flange portion 16, which are intersected by the pair of hypothetical sloped lines V1, V2, are reinforced by the rib portion 60. The rib portion 60 is inserted into a cutout portion 62 formed at the end portion 22E of the lower side flange portion 22.

Figure 9:
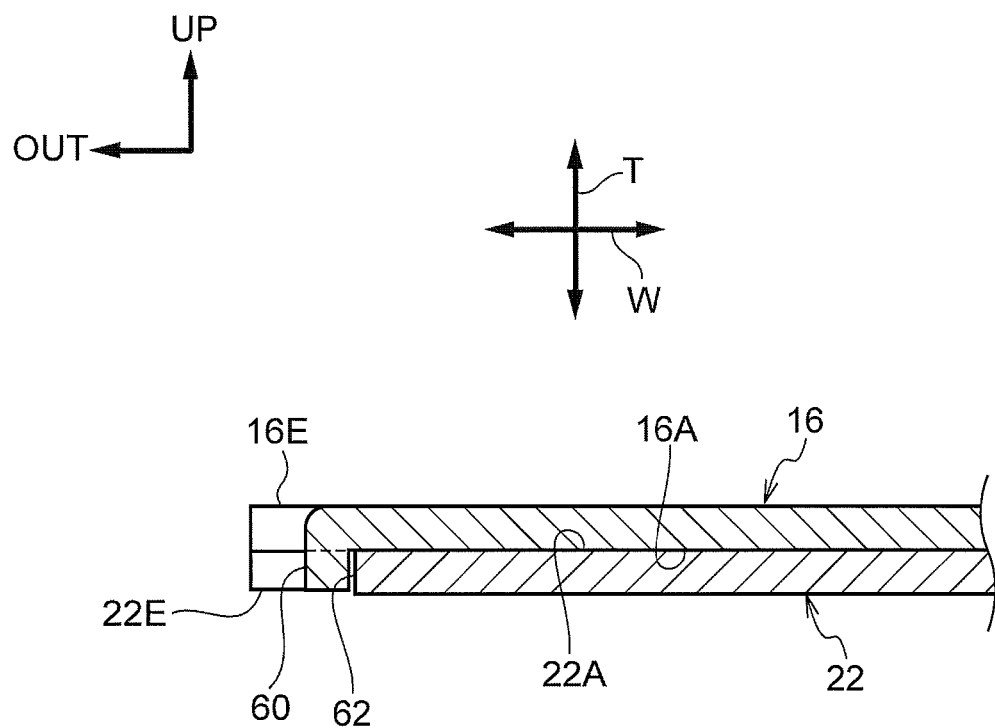
FIG. 9 is cross-section view illustrating the state illustrated in FIG. 8, in which a rib portion is fitted into a cutout portion.

The cutout portion 62 is formed at a location of the lower side flange portion 22 facing the rib portion 60. The cutout portion 62 is formed along the end portion 22E of the lower side flange portion 22. The cutout portion 62 is formed by cutting a rectangular shape out of the end portion 22E of the lower side flange portion 22. As illustrated in FIG. 9, the rib portion 60 is fitted into the cutout portion 62 in a state in which the surface 16A of the upper side flange portion 16 and the surface 22A of the lower side flange portion 22 are in close contact with each other. The upper side flange portion 16 and the lower side flange portion 22 are joined together by friction stir spot welding in this state. Note that the rib portion 60 is an example of a first engagement portion (rotation restricting section), and the cutout portion 62 is an example of a second engagement portion (rotation restricting section).

When the upper side flange portion 16 attempts to rotate in the rotation direction of the rotating pin 46 with respect to the lower side flange portion 22 accompanying friction stir spot welding, the rib portion 60 engages with a peripheral edge portion of the cutout portion 62. The upper side flange portion 16 and the lower side flange portion 22 are thereby restricted from relative rotation about the rotation axis O of the rotating pin 46. Similar advantageous effects to the above exemplary embodiment can accordingly be obtained.

The rib portion 60 is provided running along the end portion 16E of the upper side flange portion 16. Cracks, buckling, and the like are further suppressed from occurring in the end portion 16E of the upper side flange portion 16 due to the end portion 16E being reinforced by the rib portion 60.

The rib portion 60 of the present modified example cuts across both of the pair of hypothetical sloped lines V1, V2. Cracks, buckling, and the like are suppressed from occurring at locations 16E1, 16E2 of the end portion 16E of the upper side flange portion 16 due to the locations 16E1, 16E2 being reinforced by the rib portion 60.

In the present modified example, the rib portion 60 cuts across both of the pair of hypothetical sloped lines V1, V2; however, the rib portion 60 may cut across only one of the pair of hypothetical sloped lines V1, V2. Alternatively, the rib portion 60 may be disposed between the pair of hypothetical sloped lines V1, V2 without cutting across the pair of hypothetical sloped lines V1, V2.

In the above exemplary embodiment, the pair of protruding portions 30 are disposed further to the end portion 16E side of the upper side flange portion 16 than the center C of the joint portion J1 (location L2); however, placement of the pair of protruding portions 30 is not limited thereto. Protruding portions may, for example, be disposed further to the panel main body section 14 side than the center C of the joint portion J1 (location L1). Alternatively, protruding portions may be disposed on both sides of the center C of the joint portion J1, these being the extension direction leading end side (location L2), and the panel main body section 14 side (location L1), of the upper side flange portion 16.

In the above exemplary embodiment, the pair of protruding portions 30 are formed at the upper side flange portion 16 and the pair of engagement holes 32 are formed at the lower side flange portion 22; however, the above exemplary embodiment is not limited thereto. For example, a pair of engagement holes may be formed to the upper side flange portion 16, and a pair of protruding portions may be formed to the lower side flange portion 22. Alternatively, for example, protruding portions and engagement holes may be formed to the upper side flange portion 16, and engagement holes and protruding portions corresponding to the protruding portions and the engagement holes of the upper side flange portion 16 may be formed to the lower side flange portion 22.

One protruding portion 30 and the other protruding portion 30 out of the pair of protruding portions 30 may have different sizes. There is also no limitation to the pair of protruding portions 30, and the upper side flange portion 16 may be configured formed with at least one protruding portion.

In the above exemplary embodiment, the rotating pin 46 is pressed against the joint portion J1 of the upper side flange portion 16; however, the rotating pin 46 may be pressed against the joint portion J2 of the lower side flange portion 22. Namely, the rotating pin 46 may press from one thickness direction side of the upper side flange portion 16 and the lower side flange portion 22 against a location where the upper side flange portion 16 and the lower side flange portion 22 are overlapped with each other. Note that in cases in which the rotating pin 46 presses against the lower side flange portion 22, the lower side flange portion 22 is suppressed from following the rotation of the rotating pin 46 by the pair of protruding portions 30 and the pair of engagement holes 32.

The friction stir spot welding structure according to the above exemplary embodiment is not limited to the roof panel 12 and the roof panel reinforcement 20, and may be applied, for example, to a hood and a member joined to the hood (such as a hood reinforcement). The friction stir spot welding structure according to the above exemplary embodiment may also be applied to a fender and a member joined to the fender, or to a door panel (door outer panel) and a member joined to the door panel, as appropriate.

The friction stir spot welding structure according to the above exemplary embodiment may be applied to a metal member made of aluminum, iron, steel, or the like, or to a resin member, as appropriate.

An exemplary embodiment of the present invention has been explained above; however, the present invention is not limited to such an exemplary embodiment, and the exemplary embodiment and the various modified examples may be combined as appropriate. It goes without saying that various embodiments may be implemented within a range not departing from the spirit of the present invention.

What is claimed is:

1. A friction stir spot welding structure comprising:
   a pair of panel members that are friction stir spot welded together by being pressed from one thickness direction side by a rotating pin rotating at a mutually overlapping location; and
   a rotation restricting section that restricts relative rotation of the pair of panel members about a rotation axis of the rotating pin,
   wherein the rotation restricting section includes:
      a first engagement portion that is formed at one of the panel members of the pair of panel members and that projects out from the one panel member toward the other panel member; and
      a second engagement portion that is formed at the other panel member of the pair of panel members and that engages with the first engagement portion in a rotation direction of the rotating pin, and
   wherein:
      the first engagement portion includes a protruding portion that is formed at one panel member of the pair of panel members and that projects in a protruding shape from the one panel member toward the other panel member; and
      the second engagement portion includes an engagement hole that is formed at the other panel member of the pair of panel members and into which the protruding portion is inserted.

2. The friction stir spot welding structure of claim 1, wherein:
   one of the panel members of the pair of panel members includes a panel main body section, and a flange portion that extends out from an end portion of the panel main body section, that is overlapped with the other panel member, and that is pressed by the rotating pin; and
   the rotation restricting section is disposed further toward an extension direction leading end side of the flange portion than a center of a joint portion between the flange portion and the other panel member.

3. The friction stir spot welding structure of claim 2, wherein the rotation restricting section is disposed on both sides of a hypothetical reference line that passes through the center of the joint portion and extends along the extension direction of the flange portion.

4. The friction stir spot welding structure of claim 2, wherein the rotation restricting section is disposed on a hypothetical sloped line sloping, with respect to a hypothetical reference line that passes through the center of the joint portion and extends along the extension direction of the flange portion, at 45 degrees from the center of the joint portion toward an end portion at the extension direction leading end side of the flange portion.

5. A friction stir spot welding structure comprising:
a pair of panel members that are friction stir spot welded together by being pressed from one thickness direction side by a rotating pin rotating at a mutuality overlapping location; and
a rotation restricting section that restricts relative rotation of the pair of panel members about a rotation axis of the rotating pin,
wherein the rotation restricting section includes:
- a first engagement portion that is formed at one of the panel members of the pair of panel members and that projects out from the one panel member toward the other panel member; and
- a second engagement portion that is formed at the other panel member of the pair of panel members and that engages with the first engagement portion in a rotation direction of the rotating pin, and wherein:
- the first engagement portion includes a rib portion that is formed along an end portion of one panel member of the pair of panel members and that extends out from the end portion toward the other panel member; and
- the second engagement portion includes a cutout portion that is formed at an end portion of the other panel member of the pair of panel members and into which the rib portion is inserted.

6. The friction stir spot welding structure of claim 5, wherein:
- one of the panel members of the pair of panel members includes a panel main body section, and a flange portion that extends out from an end portion of the panel main body section, that is overlapped with the other panel member, and that is pressed by the rotating pin; and
- the rotation restricting section is disposed further toward an extension direction leading end side of the flange portion than a center of a joint portion between the flange portion and the other panel member.

7. The friction stir spot welding structure of claim 6, wherein the rotation restricting section is disposed on both sides of a hypothetical reference line that passes through the center of the joint portion and extends along the extension direction of the flange portion.

8. The friction stir spot welding structure of claim 6, wherein the rotation restricting section is disposed on a hypothetical sloped line sloping, with respect to a hypothetical reference line that passes through the center of the joint portion and extends along the extension direction of the flange portion, at 45 degrees from the center of the joint portion toward an end portion at the extension direction leading end side of the flange portion.

* * * * *